United States Patent Office 3,232,833
Patented Feb. 1, 1966

3,232,833
HEPARIN CONTAINING COMPOSITIONS
Charles Riviere, 11 Rue de la Ferme,
Neuilly-sur-Seine, France
No Drawing. Filed Jan. 11, 1963, Ser. No. 250,770
Claims priority, application France, Jan. 17, 1962,
885,027
6 Claims. (Cl. 167—58)

The present invention relates to new pharmaceutical compositions having local action on inflammations, used chiefly in ophthalmology, for example as collyria, for the treatment of eye complaints deriving from local inflammations such as conjunctivitis, keratitis, and corneal vascularizations, in ear, nose and throat treatment, in gynaecology and in dermatology.

The invention consists in a pharmaceutical composition comprising at least one compound capable of liberating the heparin ion and at least one of the vaso-constrictors naphthazoline and a compound of the general formula:

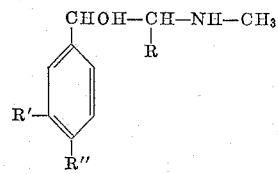

in which R represents H or $CH_3$, and R' and R" represent H or OH, for example phenylephrine, ephedrine and adrenaline.

Heparin is very widely used as a therapeutic agent, the uses of which are conventional and well known in its free state, or in the form of salts or compounds able to split up and liberate the heparin ion. However, pharmacological experiment and clinical experience have proved that in ocular pathology, practically no appreciable curative action can be observed with the use of heparin or of compounds liberating it.

The aforementioned vaso-constrictors, and phenylephrine in particular, are sympathomimetic agents: proposals have been made for their use as vaso-constrictors in oral doses of 10 to 25 mg., subcutaneous and intramuscular doses of 1 to 10 mg., intravenous doses of 0.2 to 0.8 mg. and in local applications of 0.1 to 0.5 ml. of 5% solution. However, even at concentrations of 2%, phenylephrine (for example) has practically no relevant activity in ocular pathology, the slight attenuation of the vaso-dilation of the mucous membrane which can be observed when it is applied being useful solely to help in the examination of the iris by a practitioner, and it has no action on ocular complaints of the inflammatory or congested type.

It has been concluded that the association of the said two types of compound, for example heparin and phenylephrine, in doses corresponding to the heparin content and the phenylephrine content, in which the said contents are totally inactive and it is not even possible to obtain the sum of the individual effects, makes it possible to carry out an effective treatment of inflammatory infections of the aforementioned type, and of the lesions related to them.

It is an object of the invention to provide improved pharmaceutical compositions for the treatment of ocular inflammatory complaints of the type of conjunctivitis, ear, nose and throat complaints, or complaints affecting quite different mucous membranes, in gynaecology, for example, and even in dermatology. Such compositions may contain, either in aqueous solution which can be applied as a collyrium, in drops, in a powder, in an ointment, or in pills, 0.5 to 10% by weight of heparin ions and 0.25 to 1% by weight of a vaso-constrictor of the phenylephrine type, and, if required, a certain proportion of a non-toxic mineral or organic base such as methylglucamine, corresponding to the excess of heparin anion not neutralised by the phenylephrine cation.

The surprising nature of the activity of the said compositions emerges unmistakably on consideration of the fact that they are effective in the treatment of complaints as varied as, for example: in ophthalmology, acute or chronic and ordinary or follicular conjunctivitis, or various keratites, as well as those which may be accompanied by an intense corneal vascularization, and proving resistant to all known treatments, even to attempts made with one or other of the constituents of the composition to which the invention relates, at the concentrations in which they are contained in the said compositions.

If the composition containing 0.5% heparin and 0.5% phenylephrine is considered by way of example, it will be seen from the following account of clinical experiments that it is itself highly effective. A composition with a greater concentration of heparin, having 1% heparin, for example, is more effective still, but it has proved impracticable and sometimes even undesirable because of the known secondary effects of administering simultaneously a dose of over 1% phenylephrine. This is why, in all the compositions, the proportion of phenylephrine remains relatively constant in the neighborhood of 0.5%, whilst only the proportion of heparin is greater and may rise to 4 to 5%, when the excess of heparin is neutralized, as will be explained, although this has no influence on the activity of the composition.

Thus, the compositions to which the invention relates contain about 0.5% phenylephrine, i.e. 4 to 5 times less than a dose which, as is already known, has no effect, and about 0.5% to 10% heparin, i.e. 1 to 20 times less than a concentration of 10% which has proved clinically to have no significant effect on man. The fact that the tiny proportion of phenylephrine is enough to ensure the efficacy of the heparin in all cases, the efficacy increasing, moreover, with concentration, which justifies the excess of heparin used, and appearing only in the presence of the phenylephrine, makes it likely that by some mechanism as yet unexplained, the phenylephrine acts by induction on the activity of the heparin.

It is as well to remark, in connection with these new compositions, that the nature of their constituents can give rise to certain apparent divergences of appreciation. Indeed, since heparin is really an acid—heparinic acid— and phenylephrine has an atom of basic nitrogen, it may be assumed that one of the compositions to which the invention relates consists of a simple solution of phenylephrine heparinate, and this is indeed the case when the composition contains stoichiometrically equivalent proportions of the two constituents, viz 0.5% of each.

Nevertheless, as has been explained above, when the proportion of heparin is increased, the excess of heparin over 0.5% is in the state of free acid existing alongside the aforementioned salt. Hence so as to neutralize this excess of acid, the composition also has a certain proportion of a non-toxic organic or mineral base, preferably methylglucamine.

However, this distinction seems really somewhat arbitrary, taking into account that in the solution, the ionisation of the various compounds present re-liberates individual anions and cations, so that it is possible to state, although the invention is not bound by any theory, that the surprising results observed are due to the association of heparin and phenylephrine and not to the presence of a new compound, even though a certain quantity of the compound may exist in certain pharmaceutical forms of the composition.

As an illustration, some clinical results obtained with two collyrium compositions according to the present invention will be given below:

Collyrium A:
  Phenylephrine heparinate _____ g__ 1
  Ophthalmological carrier _____ ml__ 100

(E.g. heparin 0.50%, phenylephrine 0.50%)

Collyrium B:
  Phenylephrine- and methylglucamine-
    heparinate _____ g__ 8.27
  Ophthalmological carrier _____ ml__ 100

(E.g. heparine—4%, phenylephrine—0.50%, methylglucamine—3.77%)

These two compositions and a certain number of other compositions have been used, either in aqueous solution, or as an ophthalmic cream, in two main well-defined types of ocular complaint:

(1) Acute conjunctivitis and keratitis;
(2) Former vascularized keratites and vascularized after-effects of keratoplasty.

These collyria have been prescribed with an average rhythm of ocular application of twice to four times per day in over 200 cases; a certain number of "placebo" tests have been carried out; so has the substitution of simple solutions of heparin or phenylephrine for the collyria. In all cases, the superiority of the compositions according to the invention has been proved by the following conclusions relating to the treatments carried out with collyria A and B:

(a) Considerable action on ordinary, acute or chronic conjunctivitis, and on a certain number of acute keratites, probably of viral origin. In this case, a prompt disappearance of the inflammatory symptoms was noted, and the epithelial cicatrization was rapid.
(b) No action on follicular conjunctivitis.
(c) Very considerable action on the vascularized after-effects of former keratites.

This field has been given particular study and the product seems to be active provided its use is prolonged. As a general rule, in this group of cases, there was usually a noteworthy regression of the vascularization and often a clearing—sometimes a remarkable clearing—of the cornea. No complications could be detected. The solution may safely be prescribed to patients not under surveillance, unlike the corticoids, which may have an unfortunate action in cases of recurrent ulceration.

Clinical results have been confirmed by an experimental pharmacodynamic study of the rabbit in accordance with the technique of J. H. Draize, G. Woorward and H. O. Calvery (J. Pharm. Exp. Therap. 1944, 82–377–90). As these authors have established a scale of notation for the different degrees of experimental inflammation of rabbit conjunctivitis, it has been possible to convert into figures the protective effect of the collyria of the invention in combating the inflammation produced by applying ammonia or formol to the eye of the rabbit. The results are summarized in the following table:

| Collyrium used | No. of cases | No. of favorable cases | Value of average improvement, percent |
|---|---|---|---|
| Heparin 1% | 40 | 10 | 15 |
| Heparin 5% | 20 | 20 | 29 |
| Cortisone 1% | 30 | 0 | |
| Phenylephrine 1% | 40 | 10 | 5 |
| Phenylephrine 2% | 20 | 10 | 13 |
| Phenylephrine heparinate (collyrium A) 1% | 80 | 70 | 70 |
| Double heparinate (collyrium B) 4% in heparin | 100 | 100 | 87 |

After carrying out this type of experimental ocular pathology, it was possible to draw the conclusion that heparin, when applied locally, had a curative action which was roughly proportional to its concentration, but required a high level of concentration to obtain significant results. (A concentration of 1% is virtually inactive, but a concentration of 5% shows a remarkable improvement (29%).)

Further, phenylephrine appears to have no activity of its own up to the maximum concentration of 2% used. The details of the experiments showed evidence only of a slight attenuation of the vaso-dilation of the mucous membrane.

However, phenylephrine heparinate at 1% (i.e. roughly at the concentration of 0.5% heparin and 0.5% neo-synephrine) gave noteworthy healing results. The activity of the ophthalmia may be evaluated as 70% of the experimental value under consideration.

Double phenylephrine- and methylglucamine-heparinate at 8.27% (i.e. 4% heparin and 0.5% phenylephrine) showed a greater protective action in all cases, with an improvement of 87%.

Abundant references have been made in the foregoing to the application in ophthalmology of the compositions to which the invention relates; as was indicated in the preamble, the field of application of such compositions is much wider; indeed, it covers the treatment of all infections of the mucous membranes and even, in certain cases, of the skin itself. In order to illustrate such an application in a different field from that of ophthalmology, reference will now be made more particularly to the use of the compositions in ear, nose and throat treatment. In these cases the compositions may be administered in the form of drops or powders containing, per 100 ml. of distilled water:

Double heparinic acid salt monobasic in phenylephrine
  an hexabasic in methylglucamine _____ mg__ 5
Citric acid _____ mg__ 50
Sodium citrate _____ g__ 2
Ammonium sulphate _____ g__ 3

A subsidiary addition to this liquid composition may be made using a suitable quantity of an antibiotic, e.g. 1 g. of Framycetine sulphate and a small amount of disinfectant, e.g. 500 mg. of chlorbutol.

The same composition may also be administered in the form of pills to be sucked, containing:

G.
Heparin _____ 0.010–0.100
Phenylephrine _____ 0.005–0.025 or as an ointment containing:

Percent
Heparin _____ 0.50–5
Phenylephrine _____ 0.10–1.0

These compositions have been tested on various infections, viz on ear infections (external otitis, otitis media, acute and chronic otitis, the after-effects of interventions), acute and chronic rhrinitis and rhino-pharyngitis, sinusitis and the after-effects of nasal and/or sinus interventions.

The results of the observations were as follows:
First, it was noticed that tolerance was excellent, both in the ear infections and in the rhino-pharyngeal infections, even where there was a wide perforation of the ear-drum, where the use of medicaments has so far always given rise to very sharp pain.

Second, turning now to the individual results, the following details can be quoted:

(a) In a case of external otitis in a child, the disappearance within 48 hours of the pain and of the threat to the ear itself were observed;
(b) In a case of acute otitis in a baby, local treatment, well tolerated, led to recovery;

(c) In five cases of chronic otitis, the application of the product led in three cases to the disappearance of the discharge and in two to a considerable reduction of it;

(d) In six cases of patients who had ear operations in which the discharge had started again, success was striking, and the discharge disappeared;

(e) In sixteen cases of acute rhino-sinusitis, excellent results were obtained in twelve cases; in only one case were there virtually no results;

(f) In six cases of chronic rhino-pharyngitis, there was only one case that did not improve;

(g) And finally, in fifteen cases of chronic rhinitis with hypertrophy of the turbinated bones, only two cases showed little change and only one none at all.

To sum up: in this field of application, the compositions to which the invention relates, administered as aural applications of 5 to 10 drops of the solution defined above inserted in the ear 2 to 5 times daily, or as rhino-pharyngeal nasal insertions of the same solution 2 to 4 times daily, have yielded out of 58 cases, 43 very good results, 8 average results and only 7 negative results.

The foregoing description has related to the use of heparin itself as a compound capable of liberating the heparin ion, but it is well understood that under "Heparin" is usually meant the sodium salt of heparinic acid, and that in the foregoing specification as well as in the following claims, "heparin" will mean any organic or inorganic salt of heparinic acid capable of liberating the heparin ion, such as alkali metal salts and alkaline earth metal salts, for example sodium heparinate, calcium heparinate and the like, as well as amine salts, for example choline heparinate, procaine heparinate and the like.

I claim:

1. A pharmaceutical composition comprising 0.5 to 10% by weight of heparin and 0.25 to 1% by weight of phenylephrine, and ophthalmological carrier.

2. A pharmaceutical composition comprising a combined heparinate of both phenylephrine and methylglucamine.

3. An ophthalmological collyrium comprising phenylephrine and methylglucamine heparinates in the proportions of about 0.5 to 10% by weight of heparine, 0.25 to 1% by weight of phenylephrine, an ophthalmological carrier, and methylglucamine in a quantity sufficient to neutralize any excess of heparine over the phenylephrine.

4. A pharmaceutical composition comprising 0.5–10% by weight of heparin and 0.25–1% by weight of phenylephrine in the form of an ointment.

5. A composition as claimed in claim 2 in pill form.

6. A pharmaceutical composition comprising 0.5–10% by weight of heparin and 0.25–1% by weight of phenylephrine, said composition further comprising methylglucamine.

References Cited by the Examiner

UNITED STATES PATENTS

| 3,062,716 | 11/1962 | Montandraud | 167—74 |
| 3,112,246 | 11/1963 | Hermann | 167—74 |

FOREIGN PATENTS

| 121,978 | 8/1946 | Australia. |
| 1,024,072 | 3/1953 | France. |

OTHER REFERENCES

Chem. Abst. Fifth Decennial Index, 1949–1956, page 5582S.

U.S. Dispensatory, 25th Ed., 1955, Lippincott Co., Phila., Pa., page 504.

JULIAN S. LEVITT, *Primary Examiner.*

FRANK CACCIAPAGLIA, Jr., S. ROSEN,
*Assistant Examiners.*